US009040865B2

(12) United States Patent
Beeson et al.

(10) Patent No.: US 9,040,865 B2
(45) Date of Patent: May 26, 2015

(54) CORROSION RESISTANT ALLOY WELDMENTS IN CARBON STEEL STRUCTURES AND PIPELINES TO ACCOMMODATE HIGH AXIAL PLASTIC STRAINS

(75) Inventors: Danny L. Beeson, Houston, TX (US); James B. LeBleu, Jr., Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 963 days.

(21) Appl. No.: 12/524,693

(22) PCT Filed: Jan. 31, 2008

(86) PCT No.: PCT/US2008/001409
§ 371 (c)(1),
(2), (4) Date: Jul. 27, 2009

(87) PCT Pub. No.: WO2008/105990
PCT Pub. Date: Sep. 4, 2008

(65) Prior Publication Data
US 2010/0089463 A1    Apr. 15, 2010

Related U.S. Application Data

(60) Provisional application No. 60/903,765, filed on Feb. 27, 2007.

(51) Int. Cl.
| | |
|---|---|
| *F16L 9/14* | (2006.01) |
| *B23K 31/12* | (2006.01) |
| *B23K 9/23* | (2006.01) |
| *C21D 8/10* | (2006.01) |

(52) U.S. Cl.
CPC . *B23K 31/12* (2013.01); *B23K 9/23* (2013.01); *B23K 2203/04* (2013.01); *C21D 8/10* (2013.01)

(58) Field of Classification Search
CPC .......... B23K 9/00; B23K 11/02; B23K 11/00; B23K 9/025; B23K 31/02; B23K 15/00; B21C 37/08; G05B 19/18

USPC .............................. 219/59.1, 60 R, 61, 69.1, 219/121.11–121.14, 136, 146.23; 148/320, 148/598, 654, 909; 138/177; 703/7
See application file for complete search history.

(56) References Cited

U.S. PATENT DOCUMENTS

| | | | | |
|---|---|---|---|---|
| 2,759,249 | A | * | 8/1956 | Eberle ........................... 428/638 |
| 3,726,668 | A | | 4/1973 | Lank |

(Continued)

FOREIGN PATENT DOCUMENTS

| | | |
|---|---|---|
| DE | 195 27 634 A1 | 1/1997 |
| EP | 1 112 804 A2 | 7/2001 |

(Continued)

OTHER PUBLICATIONS

Denys, R.M., "A Plastic Collapse-Based Procedure for Girth Weld Defect Acceptance", Proceedings of Int'l Conference on Pipeline Reliability, 1992, pp. 2-1/2-13, Pergamon Press, v. II, Paper VIII, Canmet, Calgary, CA.

(Continued)

*Primary Examiner* — Brian Jennison
(74) *Attorney, Agent, or Firm* — ExxonMobil Upstream Research Law Department

(57) ABSTRACT

A method and apparatus for joining materials having primarily ferritic properties is described. The method includes joining the ferritic materials using a welding process and a weld material having a primarily austenitic microstructure. The resulting weldment enhances the properties of yield ratio, uniform elongation, toughness and tearing resistance thereby producing superior strain capacity. High strain capacity produces a structure that accommodates high axial loading. The weldment can also accommodate larger than conventional weld flaws while maintaining sufficient strength, tearing resistance, and fracture toughness under high axial loading.

43 Claims, 4 Drawing Sheets

(56) References Cited

U.S. PATENT DOCUMENTS

| | | | |
|---|---|---|---|
| 3,983,745 A | 10/1976 | Juusola | |
| 4,029,932 A * | 6/1977 | Cook | 219/121.63 |
| 4,333,670 A | 6/1982 | Holko | |
| 5,005,423 A | 4/1991 | Poormom | |
| 5,019,189 A | 5/1991 | Kumura et al. | |
| 5,136,497 A | 8/1992 | Coe et al. | |
| 5,159,174 A | 10/1992 | Yeo | |
| 5,171,968 A * | 12/1992 | Bates et al. | 219/146.22 |
| 5,202,837 A | 4/1993 | Coe et al. | |
| 5,272,305 A | 12/1993 | Endo et al. | |
| 5,300,751 A | 4/1994 | Endo et al. | |
| 5,313,039 A | 5/1994 | Harvey et al. | |
| 5,319,983 A | 6/1994 | Brown et al. | |
| 5,508,801 A | 4/1996 | Panin et al. | |
| 5,523,540 A | 6/1996 | Coldren et al. | |
| 5,545,269 A | 8/1996 | Koo et al. | |
| 5,673,203 A | 9/1997 | Annigeri et al. | |
| 5,688,419 A | 11/1997 | Offer | |
| 5,723,089 A | 3/1998 | Chijiiwa et al. | |
| 5,755,895 A | 5/1998 | Tamehiro et al. | |
| 5,826,213 A | 10/1998 | Kennefick | |
| 5,961,748 A | 10/1999 | Ono et al. | |
| 6,000,277 A | 12/1999 | Smith et al. | |
| 6,129,999 A | 10/2000 | Ueda et al. | |
| 6,140,601 A | 10/2000 | Ono et al. | |
| 6,155,292 A | 12/2000 | Kurata | |
| 6,159,310 A | 12/2000 | Inoue et al. | |
| 6,172,511 B1 | 1/2001 | Nicholls et al. | |
| 6,188,037 B1 | 2/2001 | Hamada et al. | |
| 6,248,191 B1 | 6/2001 | Luton et al. | |
| 6,303,891 B1 | 10/2001 | Gault | |
| 6,358,336 B1 | 3/2002 | Miyata | |
| 6,388,233 B1 | 5/2002 | Aberg et al. | |
| 6,392,193 B1 | 5/2002 | Mallenahalli et al. | |
| 6,464,802 B1 | 10/2002 | Miyata et al. | |
| 6,512,982 B2 | 1/2003 | Yang et al. | |
| 6,523,999 B1 | 2/2003 | Ishii et al. | |
| 6,540,848 B2 | 4/2003 | Miyata et al. | |
| 6,565,678 B2 | 5/2003 | Fairchild et al. | |
| 6,648,209 B2 | 11/2003 | Hohl et al. | |
| 6,712,912 B2 | 3/2004 | Richards et al. | |
| 6,749,697 B2 | 6/2004 | Bergstrom et al. | |
| 6,767,416 B2 | 7/2004 | Ishibashi | |
| 6,768,974 B1 * | 7/2004 | Nanjundan et al. | 703/7 |
| 6,778,916 B2 | 8/2004 | Lee | |
| 6,782,921 B1 | 8/2004 | Tsuru et al. | |
| 6,831,250 B2 | 12/2004 | Handa et al. | |
| 6,858,813 B1 | 2/2005 | Keller et al. | |
| 6,885,948 B2 | 4/2005 | Dupuis et al. | |
| 7,006,947 B2 | 2/2006 | Tryon, III et al. | |
| 7,013,224 B2 | 3/2006 | Landry et al. | |
| 7,016,825 B1 | 3/2006 | Tryon, III | |
| 7,048,810 B2 * | 5/2006 | Petersen et al. | 148/320 |
| 7,074,286 B2 | 7/2006 | Klueh et al. | |
| 7,161,109 B2 | 1/2007 | Neff et al. | |
| 7,166,817 B2 | 1/2007 | Stava et al. | |
| 7,211,765 B2 | 5/2007 | Trube et al. | |
| 7,238,434 B2 | 7/2007 | Amaya et al. | |
| 7,269,520 B2 | 9/2007 | Marti et al. | |
| 7,277,162 B2 | 10/2007 | Williams | |
| 7,299,686 B2 | 11/2007 | Briaud et al. | |
| 7,513,165 B2 | 4/2009 | Suzuki et al. | |
| 7,862,666 B2 | 1/2011 | Kimura et al. | |
| 2003/0062402 A1 * | 4/2003 | Takahashi et al. | 228/256 |
| 2003/0145913 A1 | 8/2003 | Toyooka et al. | |
| 2006/0025937 A1 | 2/2006 | Gao et al. | |
| 2006/0112768 A1 | 6/2006 | Shuster et al. | |
| 2006/0206295 A1 | 9/2006 | Tryon, III | |
| 2006/0230839 A1 * | 10/2006 | Morrison et al. | 73/800 |
| 2006/0233485 A1 | 10/2006 | Allen | |
| 2006/0289480 A1 | 12/2006 | Slack et al. | |
| 2007/0078554 A1 | 4/2007 | St. Ville | |
| 2007/0125462 A1 | 6/2007 | Asahi et al. | |
| 2007/0193666 A1 | 8/2007 | Asahi et al. | |
| 2007/0205001 A1 | 9/2007 | Shuster et al. | |
| 2007/0215360 A1 | 9/2007 | Shuster et al. | |
| 2007/0269678 A1 | 11/2007 | Ono et al. | |
| 2008/0023092 A1 | 1/2008 | Klar | |
| 2008/0226396 A1 | 9/2008 | Garcia et al. | |
| 2008/0277398 A1 | 11/2008 | Wilson | |
| 2008/0314481 A1 | 12/2008 | Garcia et al. | |
| 2009/0065102 A1 | 3/2009 | Shinohara et al. | |
| 2009/0132183 A1 | 5/2009 | Hartog et al. | |
| 2009/0177417 A1 | 7/2009 | Yonemura et al. | |
| 2009/0208768 A1 | 8/2009 | Suzuki et al. | |
| 2009/0240646 A1 | 9/2009 | Tryon, III | |
| 2009/0326865 A1 | 12/2009 | Ziegel et al. | |
| 2010/0084377 A1 | 4/2010 | Belloni et al. | |
| 2010/0088076 A1 | 4/2010 | Koutsabeloulis et al. | |
| 2010/0300184 A1 | 12/2010 | Wayman et al. | |
| 2011/0070457 A1 | 3/2011 | Takahashi et al. | |
| 2011/0088910 A1 | 4/2011 | McCann et al. | |
| 2011/0137616 A1 | 6/2011 | Tognarelli et al. | |
| 2011/0259478 A1 | 10/2011 | Schneider et al. | |
| 2012/0018028 A1 | 1/2012 | Shimamura et al. | |
| 2012/0298628 A1 | 11/2012 | Bowers | |

FOREIGN PATENT DOCUMENTS

| | | |
|---|---|---|
| JP | 56 056797 | 5/1981 |
| JP | 02 099294 | 4/1990 |
| JP | 03-207575 | 9/1991 |
| JP | 07-024577 | 1/1995 |
| JP | 2003-132107 | 5/2003 |
| RU | 2275281 | 8/2001 |
| WO | WO 2007/014585 A1 | 2/2007 |
| WO | WO 2007/062071 A2 | 5/2007 |
| WO | WO 2007/073114 A1 | 6/2007 |
| WO | WO 2007/078385 A2 | 7/2007 |

OTHER PUBLICATIONS

Denys, R.M. et al, "Effects of Stable Ductile Crack Growth on Plastic Collapse Defect Assessments", *Pipeline Technology*, May 22-24, 2000, pp. 169-189, v. 1, Elsevier Science B.V.

Denys, R.M. et al, "Weld Metal Mismatch Challenges and Opportunities", Proceedings of ICAWT, Pipeline Welding and Technology Conference, Oct. 1999, pp. 1-22, Galveston, TX.

Denys, R.M., "Wide-Plate Testing of Weldments: Part 1—Wide-Plate Testing in Perspective", *Fatigue and Fracture Testing of Weldments*, ASTM STP 1058, 1990, American Society for Testing and Materials, pp. 160-174, Philadelphia, PA.

Denys, R.M., "Wide-Plate Testing of Weldments: Part 2—Wide-Plate Evaluation of Notch Toughness", *Fatigue and Fracture Testing of Weldments*, ASTM STP 1058, 1990, American Society for Testing and Materials, pp. 175-203, Philadelphia, PA.

Denys, R.M., "Wide-Plate Testing of Weldments: Part 3—Heat-Affected Zone Wide-Plate Studies", *Fatigue and Fracture Testing of Weldments*, ASTM STP 1058, 1990, American Society for Testing and Materials, pp. 204-228, Philadelphia, PA.

Horsley, D. J. et al., "An Assessment Technique for Defects in Under and Over Matched Pipeline Girth Welds", Proceedings of the PRCI-EPRG, 11th Biennial Joint Technical Meeting on Line Pipe Research, 1997, pp. 30-1/30-10, Paper 30, Washington.

Hukle, M.W. et al., "Girth Weld Qualification for High Strain Pipeline Applications", 24th Int'l Conf. on Offshore Mechanics & Arctic Eng., Jun. 12-17, 2005, pp. 1-6, Halkidiki, Greece.

Mohr, W., "Strain-Based Design of Pipelines", Report Project No. 45892GTH, Oct. 8, 2003, EWI.

Soete, W. & Denys, R. M., "Fracture Toughness Testing of Welds", Proceedings of Conference on Welding of HSLA (Micro-alloyed) Structural Steels, Nov. 1976, pp. 63-84, Roma.

EP Search Report No. RS 115215, Jun. 12, 2007, 3 pages.

English (machine) translation of JP 03-207575 Abstract, 1 page.

English (machine) translation of JP 07-204577 Abstract, 1 page.

English (machine) translation of JP 2003-132107 Abstract, 1 page.

* cited by examiner

US 9,040,865 B2

CORROSION RESISTANT ALLOY WELDMENTS IN CARBON STEEL STRUCTURES AND PIPELINES TO ACCOMMODATE HIGH AXIAL PLASTIC STRAINS

CROSS REFERENCE TO RELATED APPLICATIONS

This application is the National Stage of International Application No. PCT/US2008/001409, filed 31 Jan. 2008, which claims the benefit of U. S. Provisional Application No. 60/903,765, filed 27 Feb. 2007.

BACKGROUND OF THE INVENTION

The present invention relates to methods for joining two pieces of metal. More specifically, in using austenitic weld materials to join two ferritic materials, which may be utilized in the production or transport of fluids, such as hydrocarbons, or other strain based applications.

DESCRIPTION OF THE RELATED ART

Typically, plain carbon and low alloy steel weld consumables produce welds that are dominated by ferritic microstructures. Common microstructural components in these ferritic weld metals include ferrite, pearlite, bainite, martensite or derivatives or mixtures of these components. These ferritic welds typically have limitations in toughness and tearing resistance, particularly at low temperatures. These limitations restrict the amount of strain that can be accommodated in a structural design and limits the allowable weld defect sizes. The limited strain capacity of typical ferritic welds also increases the amount of time/effort necessary to perform weld qualification testing, inspection, and production welding.

Designs for steel structures, such as pipelines, have been pushed from conventional stress-based designs, where materials remain mostly elastic, to strain-based designs, where materials are designed to function plastically. Plastic strains in pipelines can be experienced due to events such as pipeline reeling, seismic activity, freeze-thaw weather cycles, soil liquefaction, thermal cycles, and other loading conditions. These environmental and operating conditions can impose extreme loads on a pipeline and it is the design engineer's responsibility to establish the required strain capacity of the pipeline materials based on study of these loads. Accordingly, strain-based designs must utilize materials with resilient properties, particularly in the welds, to avoid structural failure.

Conventional stress-based designs typically limit loading to some fraction of the material's yield strength thus avoiding plastic deformation. Typical fractions vary from about 0.3 to about 0.8. On the contrary, strain-based designs quantify the applied loads in terms of the applied strains and the limits on loads are expressed in terms of strain limits that allow a certain amount of plastic strain to occur. Typical strain magnitudes for strain-based designs are generally defined as global plastic strains in excess of 0.5%. Global plastic strains are defined as strains measured along a length of base material (and straddling the weld or welds in question) that is sufficiently large to avoid definition problems with strains in the immediate vicinity of the structural welds. For example, with an oil or gas pipeline, global plastic strains for strain-based design purposes could be in reference to a section of the pipeline that is about two pipe diameters in length, although other similar definitions could be used to define global plastic strains.

Practical measurement of the load carrying capacity of steels and welds, including cases when defects are present, can be conducted using the wide plate test, a method pioneered in the mid 19th century by A. A. Wells who worked for many years at The Welding Institute in Cambridge, England. The wide plate test has been used extensively to assess the fracture resistance of steels and welds to be used in stress-based designs. Although originally designed as a test for flat structural steel plate, by the 1990s a related version of this test was developed for curved pieces such as specimens cut from large diameter steel pipes. This version of the test is commonly referred to as the curved wide plate test (CWPT). Related to strain-based designs, practical measurement of the strain capacity of a pipe material, or a girth weld in pipe, is often done using the CWPT. This test can be used as a measure of global plastic strain capacity.

As shown in FIG. 1, a CWPT specimen 12 may be cut from a pipe girth weld 10. Typically, a surface breaking defect, such as a notch 14, is machined into the weld metal or heat affected zone. These defects are often referred to by their size (e.g., their depth and width, such as 3 mm×50 mm or 3×50 mm, respectively). Sometimes the total defect area is useful to the experimenter. For example, if the defect has a size of 3×50 mm, the area of the defect is about 150 milllimeters$^2$ (mm$^2$). Defect areas of interest rarely exceed 1000 mm$^2$. In this example, the CWPT specimen 12 has a weld length 15 of 300 mm in the reduced section 14 while the length of this reduced section 16 is 550 mm. The width of the expanded ends 17 also known as the shoulder areas is 450 mm and the total length 18 being 900 mm. The CWPT specimen 12 is typically instrumented with linear variable displacement transducer (LVDT) gauges at various locations 19 on either side of the defect to measure the elongation of the CWPT specimen 12 when pulled in tension in the directions shown by arrows 26. Other instrumentation, such as strain gauges or other connection points for the LVDT gauges, can be used as well.

As shown in FIG. 2, once the CWPT specimen 12 is loaded to failure in tension, the output from the test is represented by a plot 20 of tensile load on the y-axis 22 and strain on the x-axis 24 where strain is measured using the data from the LVDTs. Other variations of data output, such as stress versus strain may also be plotted. The response 23 on the plot 20 resembles a stress-strain curve from a routine tensile test on structural steel. The response 23 includes an initial linear portion 26 that extends up to the elastic limit 27, which is typically at about 0.5% strain, followed by a non-linear portion 28 that describes the plastic deformability of the CWPT specimen 12. The strain achieved at the point of maximum load position 29 is often used as a measure of strain capacity (e.g., global plastic strain). For large diameter carbon-manganese pipe steels, typical strain capacities as measured by the CWPT may range from values somewhat less than yielding of about 0.3 to about 0.5% strain and up to about 8% strain, or in some cases up to 10% strain with rare cases up to about 15% or 20% strain. The strain capacities depend on the quality of the steel and/or the girth weld, and the defect size.

Details of some techniques for CWPT are provided in the following papers: R. M. Denys, "Wide-Plate Testing of Weldments: Part 1—Wide Plate Testing in Perspective," Fatigue and Fracture Testing of Weldments, ASTM STP 1058, H. I. McHenry and J. M. Potter, Eds., ASTM Philadelphia, 1990, pp. 160-174; R. M. Denys, "Wide-Plate Testing of Weldments: Part 2—Wide Plate Evaluation of Notch Toughness," Fatigue and Fracture Testing of Weldments, ASTM STP 1058, H. I. McHenry and J. M. Potter, Eds., ASTM Philadelphia, 1990, pp. 175-203; R. M. Denys, "Wide-Plate Testing of Weldments: Part 3-Heat Affected Zone Wide Plate Studies," Fatigue and Fracture Testing of Weldments, ASTM STP 1058, H. I. McHenry and J. M. Potter, Eds., ASTM Philadelphia, 1990, pp. 204-228; and M. W. Hukle, A. M. Horn, D. S. Hoyt, J. B. LeBleu, "Girth Weld Qualification for High Strain Pipeline Applications", Proc. of the 24th Int'l Conf. on Offshore Mechanics and Arctic Eng., (OMAE 2005), June 12-17, Halkidiki, Greece.

To employ a strain-based design, and the advantages the strain-based design offers, extensive materials testing is utilized to verify boundary conditions for safe operation and integrity of the structure. It has been experimentally determined that for conventional strain-based designs of ferritic steel welded components, the primary properties that determine performance are the percent overmatch of the weld metal versus the pipe yield strength in addition to other pipe and weld metal mechanical properties. The pipe and weld metal properties include yield strength to tensile strength ratio (YR), uniform elongation (elongation at the onset of maximum load), toughness, and tearing resistance. Low YR, high uniform elongation and good toughness and tearing resistance are desirable properties for robust strain-based designs.

Unfortunately, ferritic weld metal consumables have limited tearing resistance, fracture toughness, and strain hardening capacity. When these consumables are used in strain-based designs, the allowable flaw sizes in the weld and fusion line are significantly limited by these properties. Additionally, the use of ferritic weld metal consumables involves complex weld testing and analysis along with precise weld parameter control to provide adequate weld performance.

Accordingly, there is a need for a joining method for ferritic structural steels that produces welds capable of accommodating significant plastic strains, permits larger allowable weld flaws, and simplifies weld testing and qualification.

SUMMARY OF THE INVENTION

The present invention provides a technique for producing resilient weld joints between ferritic structural steel components whereby the weldment is beneficial to strain-based designs. Strain-based design refers to design of structural components that are capable of absorbing predicted global plastic strains while in service. The weld metals provided by this invention are superior to conventional ferritic welds for strain-based designs. They are capable of absorbing high strains, can permit the acceptance of larger weld flaws without repair, and can simplify the weld testing and qualification regimen of a typical construction project. The welds provided by this invention are unique to strain-based applications in that they are made using weld consumables that are nominally austenitic in microstructure. Corrosion resistant alloy (CRA) welding consumables are a name that is used in the current invention to refer to this group of welding consumables. This group includes, but is not limited to, nickel-based alloys, stainless steels, and duplex stainless steels, or similar. Examples of such consumables include, but are not limited to, American Welding Society (AWS) ENiCrMo-4, ENiCrMo-6, ENiCrMo-14, ENiMo-3, E310, E308, E316, E2209 and E2553, derivatives and alloys thereof.

In one or more of the embodiments of the invention, any of the typical API (American Petroleum Institute) Pipe Specification 5L pipe grades (such as X52 up to X80, or X100, or X120) can be welded with the CRA consumables. The resultant girth weld is capable of withstanding global plastic strains in excess of 0.5%, preferably in excess of 1%, more preferably in excess of 1.5%, or even more preferably in excess of 2%. For demanding applications, the CRA consumables can be applied to achieve global plastic strains in excess of 4% strain. The global plastic strain that a pipeline can sustain, which may be referred to as the global strain capacity, is limited by the properties of the girth welds and pipeline steel. For example, in the case of a pipeline comprising large diameter carbon-manganese steel pipes coupled by girth welds, typical global strain capacities may range from values less than yielding of about 0.3% strain to about 0.5% strain, and up to about 8% strain, or in some cases up to 10% strain, or up to about 15% or 20% strain, which represents a practical upper limit for global strain capacity of steel pipelines. The global strain capacity for the girth weld and the joined material may be determined from experimental data or estimated from experience. Further, the combination of ferritic structural steel components and the CRA welding consumables produces a weld that achieves the resilient strain properties by possessing a superior combination of mechanical properties. These properties include low yield strength to tensile strength ratio, high uniform elongation, and good toughness and tearing resistance. A combination of these properties enables these welds to achieve high plastic strains even though these welds can in some circumstances produce undermatched yield strengths compared to the base metal of up to 10%, or possibly 20%, or even in some cases as much as 30%. These welds are ideally suited for creating girth welds used in constructing large diameter oil and gas transmission pipelines when a strain-based design is desired.

Any of a number of the common welding processes can be used to apply the combination of ferritic base metals welded using CRA welding consumables, the construction being placed into service as a strain-based design. Suitable welding processes for joining the base metals include, but are not limited to, shielded metal arc welding (SMAW), gas metal arc welding (GMAW) or metal inert gas (MIG) welding, gas-tungsten arc welding (GTAW) or tungsten inert gas (TIG) welding, flux-cored arc welding (FCAW), submerged arc welding (SAW), double submerged arc welding (DSAW), pulsed-gas metal arc welding (PGMAW), pulsed-gas tungsten arc welding (PGTAW), laser welding, electron beam welding, etc. or combinations thereof.

In another embodiment, two pieces of API 5L grade X70 pipe of dimensions having 24 inch (in) outer diameter (OD) by 12.5 millimeter (mm) wall thickness, were joined using ENiCrMo-6 as the weld metal. The welds were produced using a combination of the GTAW and SMAW processes. The girth welds were tested using the CWPT with 3×50 mm and 4×50 mm notches placed in either the weld metal or the heat affected zone. The test results demonstrated that the weld is capable of withstanding global plastic strains in excess of 0.5% plastic strain, preferably 1% plastic strain, more preferably 1.5% plastic strain, or even more preferably 2% plastic strain. For some demanding applications the CRA consumables can be applied to achieve in excess of 4% strain. The global plastic strain for the girth weld and the joined material may again be limited by a maximum global strain capacity, or other specified strain limit, which may be defined by experimental data or a personal experience.

DETAILED DESCRIPTION

Introduction and Definitions

Figure 1:
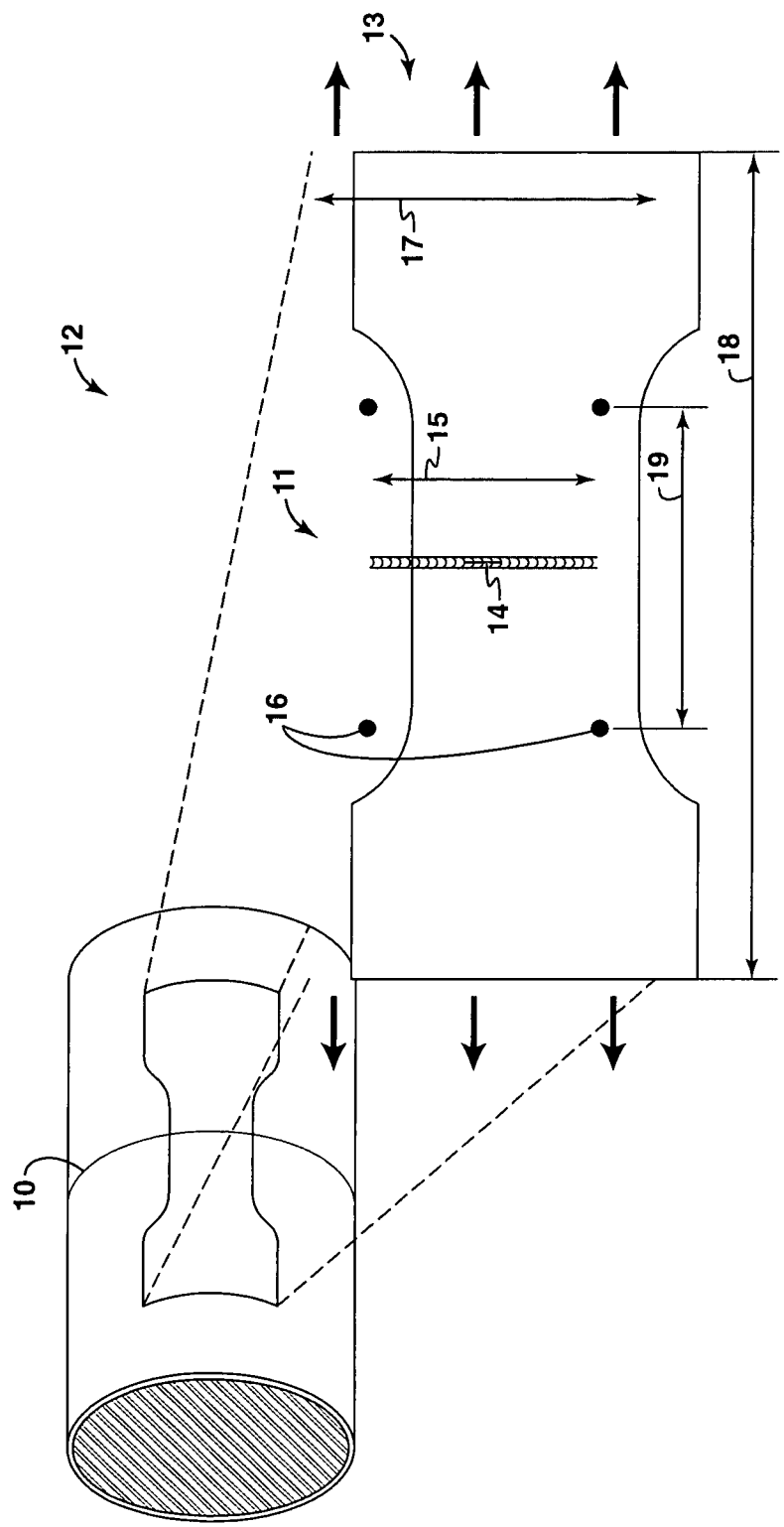
FIG. 1 is an exemplary CWPT specimen removed from a pipe girth weld.
Figure 2:
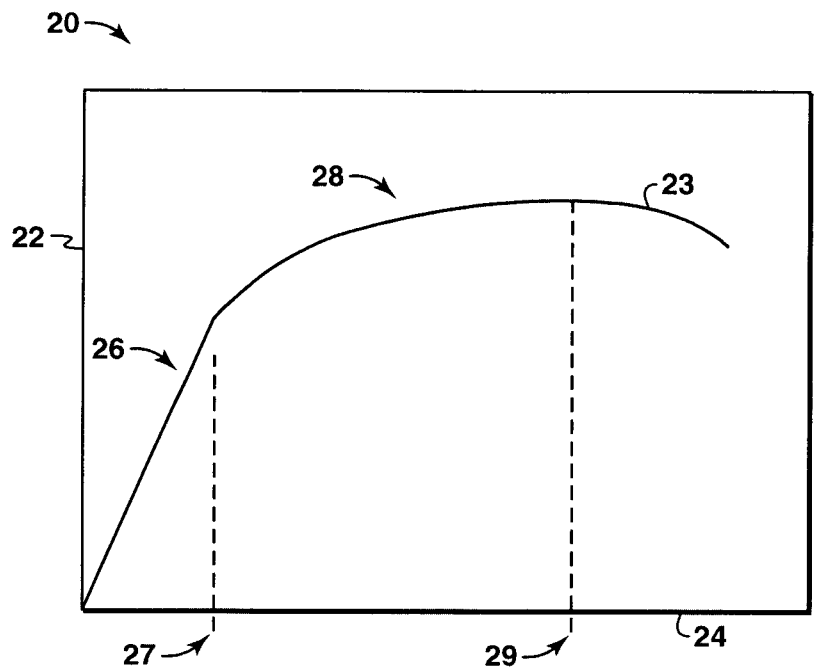
FIG. 2 is an exemplary plot of tensile load verses strain applied to the CWPT specimen.

Embodiments of the present invention provide a method and apparatus that may be used to join two ferritic metals using austenitic weld materials.

Joining tubular sections of a pipeline made of a material exhibiting a primarily ferritic microstructure is a specific, but not limiting, example of an application in which techniques in accordance with embodiments of the present invention may be used to advantage. However, those skilled in the art will recognize that similar techniques may also be used in a variety of other applications, for example, where high axial loading and plastic strains are expected.

As used herein, the term strain-based design refers to the design of a structure such that the environmental and operational loads are quantified in terms of the applied strains and the limits on loads are expressed in terms of strain limits that allow a certain amount of plastic strain to occur.

As used herein, the term corrosion resistant alloy (CRA) generally refers to a metal that may resist deterioration due to adverse physical conditions. Various types of CRA welding consumables that may be suitable for use as described herein include, but are not limited to American Welding Society (AWS) ENiCrMo-4, ENiCrMo-6, ENiCrMo-14, ENiMo-3, E310, E308, E316, E2209 and E2553, derivatives and alloys thereof. CRA materials may also include stainless steel alloys. The CRA and stainless steel metals have a primary austenitic microstructure, while duplex stainless steel metals include a dual ferritic/austenitic microstructure. The particular composition or ratio of each element for any particular alloy may be selected based on the desired properties for a given application.

As used herein, the term ferritic metal generally refers to an iron-based alloy consisting primarily of one or more of the following components: ferrite, pearlite, bainite, martensite or similar derivatives. Various types of ferritic metal that may be suitable for use as described herein include, but are not limited to carbon steel, alloy steels, structural steels, cast iron, proprietary iron-based alloys, derivatives and alloys thereof. Ferritic metals may be in any structural shape including, but not limited to, tubular shapes, pipe, bar, rod, beam, plate or foil. Ferritic steel may be used in many applications, including, but not limited to, pipelines, pressure vessels, offshore structures, buildings, vehicles, ships, bridges, towers and other structures.

As used herein, axial loading generally refers to loading orthogonal to a weld or joint. An example of such axial loading is loading parallel to a longitudinal axis of a pipeline, more particularly, loading orthogonal to a circumferential weld or girth weld in a pipeline.

Embodiments described herein provide for the use of CRA's, stainless steel and duplex stainless steel welding consumables to weld steel structures and steel pipelines. These structures and pipelines may be made from a primarily ferritic material and may be subject to high axial loading and plastic strains. The CRA and stainless steel weld metals that are employed may have a primary austenitic microstructure, while the duplex stainless steel weld metals may exhibit a dual ferritic/austenitic microstructure. These weld metals may include, but are not limited to, American Welding Society (AWS) ENiCrMo-4, ENiCrMo-6, ENiCrMo-14, ENiMo-3, E310, E308, E316, E2209 and E2553. These CRA weld materials have a low yield strength to tensile strength ratio (referred to as yield ratio, YR), such as less than about 0.75, preferably less than about 0.65, more preferably less than 0.60, and even more preferably less than about 0.55. The YR for ferritic pipeline steels varies depending on manufacturing process, grade, chemistry, etc. Typical YRs for carbon or low alloy steel pipe in the aged condition (i.e., after a hot-applied coating for corrosion resistance) are approximately as follows: API 5L grade X52: >0.70; grade X60: >0.80; grade X70: >0.85; grade X80: >0.90; grade X100: >0.95). Ferritic weld metals have YRs of a similar range based on their yield strength, however the YRs tend to be somewhat lower than those for aged pipe.

As used herein, the term single layer ferritic material refers to an iron-based alloy. The single layer ferritic material may include tubulars comprising homogeneous materials, such as steel pipe.

As used herein, the term cladded material refers to an iron-based alloy that has a layer of CRA material. The cladded material may include cladded tubulars, such as a steel pipe where the base pipe is primarily ferritic with a relatively thin layer of clad austenitic material on the inside or outside of the base pipe.

Exemplary Embodiments

Figure 3:
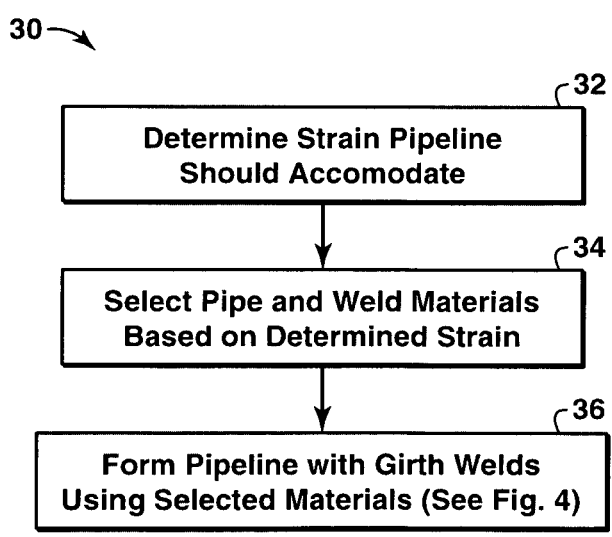
FIG. 3 is an exemplary flow chart associated with the welding and use of two pieces of metal joined in accordance with one embodiment of the present invention.

To begin, FIG. 3 is an exemplary flow chart, which is referred to by reference numeral 30, associated with the welding and use of two pieces of metal in accordance with one embodiment of the present invention. In FIG. 3, a strain-based design may be formed and utilized in the transport of fluids between two locations through a fluid transportation system or pipeline. At block 32, a specific strain-based design is determined for a specific location. This application may include sections of a pipeline that is used to transport fluids, such as hydrocarbons or other similar fluids, between two or more locations. The pipeline may be made up of tubing or tubular elements, which are discussed further below. The strain-based design may include a range of strain expected to be experienced by the pipeline. The expected range of strain may be based on modeling of a pipeline or from experience. That is, the strain-based design may include a deformation or strain that is expected for a certain application, which may be based on the environmental factors.

At block 34, the tubing and weld materials may be selected based on the specific strain-based design. The tubing may include a material having primarily ferritic properties (e.g., a single layer ferritic material, such as a homogeneous steel pipe) or a cladded material (e.g., a steel pipe where the base pipe is primarily ferritic with a relatively thin layer of clad austenitic material on the inside or outside of the base pipe. Further, the welding materials may have primarily austenitic properties to form a weld joint based on a strain-based design. In this manner, the weld joint may be configured to accommodate significant plastic strains, permit larger allowable weld flaws, and simplify weld testing and qualification. In particular, the weld joint may be configured to sustain global plastic strains in excess of 0.5%, but below the strain limit for weld joint. Further, the weld joint may be configured to sustain global plastic strains with weld defects present that have flaw areas in excess of 150 mm$^2$ up to a weld defect that renders the weld joint unsuitable for its intended purpose. The ability of the tubing and weld materials to sustain the required global plastic strains may be determined by physical testing or it may be estimated using analytical methods or previous experience.

At block 36, the tubing may be joined with weld joints. The joining of these tubing sections to form the weld joint is discussed further below in FIGS. 4-7. Then, at block 38, the joined tubing may be used for a specific application. This application may include the transport of fluids from a first location to a second location within a specific environment.

Figure 4:
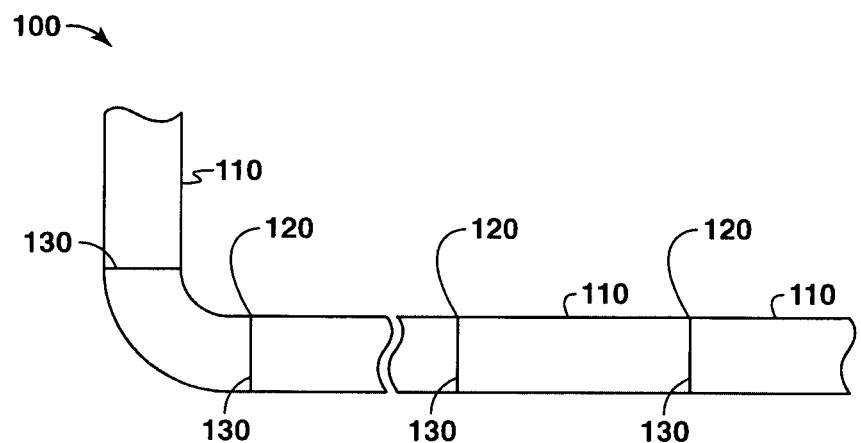
FIG. 4 is a view of a fluid transportation system in accordance with one embodiment of the present invention.

FIG. 4 illustrates a fluid transportation system 100, wherein various tubular sections 110 may be joined at welded joints 120. The fluid transportation system may be of various size and configuration, adapted to be buried under a surface or suspended above a surface. It may also be used in a variety of applications, for example, as a pipeline used for hydrocarbon transportation.

The welded joints 120 may be joined with a circumferential weld, also known as a girth weld 130, at the joints 120. In one embodiment, the tubular sections 110 include a carbon steel material having primarily ferritic properties. Examples include various American Petroleum Institute (API) grades, such as API 5L X52, API 5L X56, API 5L X60, API 5L X65, API 5L X70, API 5L X80, X100, suitable ISO grades, suitable CSA grades, suitable EU grades or equivalent or combinations thereof. The girth welds 130 include CRA's, stainless steel having a primarily austenitic microstructure, and/or duplex stainless steels having a dual ferritic/austenitic microstructure.

Figure 5:
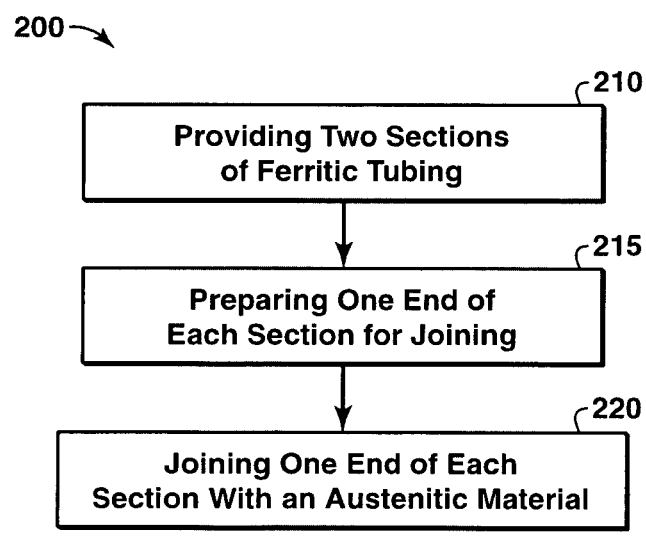
FIG. 5 is a diagram outlining a joining method in accordance with one embodiment of the present invention.

FIG. 5 is a diagram outlining one embodiment of a method 200 for joining two or more tubular sections of a pipeline. The method 200 includes providing two sections of tubing having a primarily ferritic microstructure, as shown in block 210. The two sections of tubing may be similar to the tubular sections 110 of FIG. 4. Examples of the two sections of tubing may be API 5L X52, API 5L X56, API 5L X60, API 5L X65, API 5L X70, API 5L X80, X100, X120, ISO grades, CSA grades, EU grades and/or any combinations thereof. For instance, CSA grades may include grades 359, 414, 448, 483, 550, 690, and 827. As may be appreciated, other suitable ISO and EU grades, which may be similar to the grades noted above, may also be utilized for specific applications. Block 220 includes joining one end of each section with an austenitic material by a welding process. The various austenitic materials may be CRA's, stainless steel alloys, including duplex stainless steels.

An intermediary operation prior to joining, such as fitting and/or preheat, may be utilized to prepare one end of each section of the tubing for joining, as shown in block 215 if the ends of the sections of tubing are not suitable for joining. For example, the tubular section may not be square, or the tubular section may be square but the intended joint is angled. This operation may include machining operations, such as cutting, grinding, sawing, and the like, one end of the tubing to form a desired interface and surface in preparation for welding. The desired surface may also be beveled/chamfered to facilitate welding. When welding with CRA welding consumables, joint cleanliness should be ensured as CRA welds may be more sensitive to impurities than ferritic welds.

Suitable welding processes for joining the two sections of tubing include, but are not limited to, shielded metal arc welding (SMAW), gas metal arc welding (GMAW) or metal inert gas (MIG) welding, gas-tungsten inert gas (GTAW) or tungsten inert gas (TIG) welding, flux-cored arc welding (FCAW), submerged arc welding (SAW), double submerged arc welding (DSAW), pulsed-gas metal arc welding (PGMAW), pulsed-gas tungsten arc welding (PGTAW), laser welding, electron beam welding, and the like or combinations thereof. Suitable consumable weld materials include AWS ENiCrMo-4, ENiCrMo-6, ENiCrMo-14, ENiMo-3, E310, E308, E316, E2209, E2553, or combinations thereof or other CRA materials.

Figure 6:
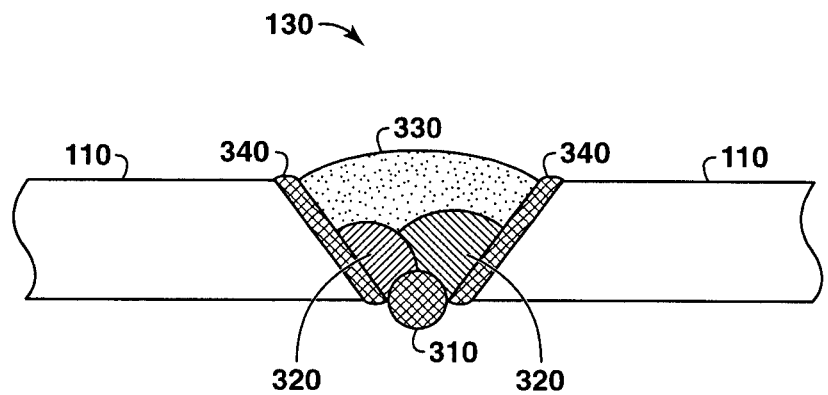
FIG. 6 is a cross-sectional view of a girth weld in accordance with one embodiment of the present invention.

FIG. 6 is a cross-sectional view of one embodiment of a girth weld 130 between two tubular sections 110, which may be produced, for example, in accordance to the method 200 of FIG. 5. In this embodiment, the tubular sections 110 are a carbon steel material having a primarily ferritic microstructure. The girth weld 130 comprises a root weld 310, one or more hot passes or filler passes 320, and a cap weld 330 to provide a full penetration joint. Alternatively, the girth weld 130 may be made using a root weld 310, followed by a plurality of filler passes 320 to form a cap weld 330, thus providing the full penetration joint. In one embodiment, the root weld 310 comprises a CRA material applied by a GTAW welding process, followed by filler passes 320 and a cap weld 330 comprising a CRA material applied by a SMAW process. FIG. 6 also shows the heat affected zone (HAZ) 340 at or near the fusion interface of the tubular sections 110 and the girth weld 130.

Figure 7:
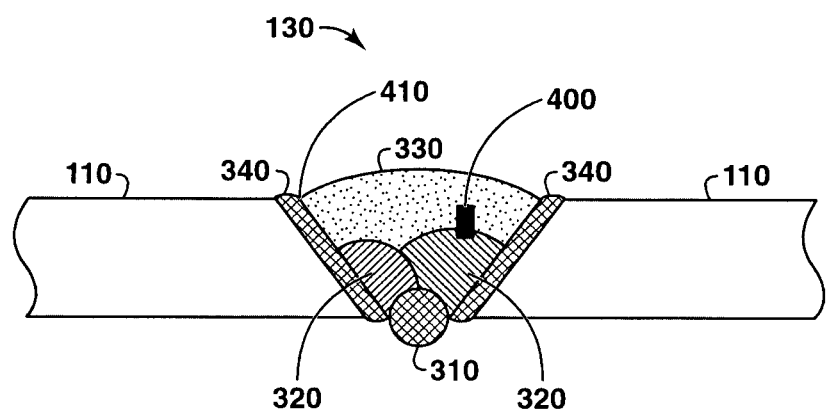
FIG. 7 is a cross-sectional view of another girth weld in accordance with one embodiment of the present invention.

FIG. 7 is a cross-sectional view of another embodiment of a girth weld 130, which is similar to the embodiment shown in FIG. 6 with the exception of a defect 400. This embodiment also shows a weld toe 410, which may be any exposed fusion interface, whether at or near the cap weld 330, or the root weld 310, and includes any weld toe 410 that may be subsequently covered by another weld pass. The defect 400 is exemplarily shown between a filler pass 320 and the cap weld 330, but the defect 400 may be at any location in or adjacent the girth weld 130. The defect 400 may be a pinhole, a toe 410 crack, an off seam weld, undercutting, incomplete fusion, porosity, slag inclusions, other discontinuity, or combinations thereof.

The defect 400 may be discovered after completion of the girth weld 130 by a non-destructive testing (NDT) procedure, such as X-ray testing, ultrasonic testing (UT), visual inspection, magnetic particle testing, eddy current testing, and/or penetrant/dye testing. If the defect 400 exceeds a pre-determined magnitude, such as size, depth, and/or percentage of weld, the defect may have to be repaired. The pre-determined magnitude is typically set during detailed design of the structure and often depends on such weld and pipe properties as toughness, weld strength overmatch, yield to tensile ratio, pipe wall thickness, and applied strain. Weld defect repair results in increased labor cost as the girth weld 130 is excavated, such as by gouging and/or grinding, at the location(s) of the defect. The excavated portion is then re-welded, and a second round of NDT is performed to qualify the repair and the girth weld 130. The cost of repairing the defect and the second NDT procedure results in higher costs for fabricating the weld, which may lower the profitability of the project.

Embodiments described herein are designed to replace the ferritic consumables typically used in joining tubular sections of a pipeline. While CRA consumables may increase consumable costs when compared to the cost of ferritic consumables, the CRA weldments accommodate larger defects when compared to ferritic weldments as will be described in greater detail below. As a result, labor costs may decrease because larger defects in the CRA weldment (if present in the weldment) may not need repair. In addition to the decreased labor costs, a second NDT procedure may not be required. In addition, thinner pipe may also be used decreasing cost for steel and welding procedures, while providing the same strain capacity and repair rate.

Testing of Ferritic Metals Joined with CRA Materials

Initial tests of actual welds generated in accordance with techniques described herein were performed using two sections of API 5L grade X70 tubulars having a 24 in OD and 12.5 mm wall thickness. The sections were joined with CRA welding consumables at the girth weld. AWS ENiCrMo-6 was used as the CRA welding consumables based on its material properties (e.g. low YR, high uniform elongation, high toughness and high tearing resistance). The welding processes include GTAW for the root weld and SMAW for the filler and cap welds.

The test results for this example showed that the CRA weld metal yield strength was less than the actual yield strength of the pipe (79.8 ksi). In fact, it is an intended aspect of the present techniques that when subjected to plastic strains, the relatively weak (in terms of yield strength) CRA weld work hardens more than the pipe (lower YR) eventually becoming stronger than the pipe thus maintaining structural integrity. Additionally, the high toughness of the CRA weld metal enables it to resist fracture during the plastic straining and work hardening. Therefore, even when the CRA weld metal undermatches the pipe yield strength, its mechanical properties are sufficient for strain-based applications. Compared with conventional carbon steel weldments, the present approach to welding strain-based design pipelines increases weld defect tolerance, and enables the pipeline to accommodate higher plastic strains for a given defect size. As shown for the initial examples in Table 1 below, the actual yield strength differences between the pipe sections and the CRA girth weld created about 20% undermatch. When these welds were subjected to curved wide plate testing, remote plastic strains of 1.4% and 4.8% were measured. These wide plates included surface-breaking notches in the weld centerline of dimensions 4×50 mm and 3×50 mm. In other words, these defects represented flaw areas of 150 mm² and 200 mm², respectively. These initial CWPTs were conducted at −2° C.

Additional CWPTs were carried out using ENiCrMo-6 as the weld metal to join sample tubulars of API 5L grade X70 having a 24 in OD and 12.5 mm wall thickness pipe. The ENiCrMo-6 girth welds were produced using GTAW for the root weld, and SMAW for the fill and cap welds. Once again 3×50 mm and 4×50 mm notches were used. These flaws were machined on the root side of each sample in either the center of the weld metal, or such that the tip of the defect was at or near the fusion line in the coarse grain HAZ. Results of these tests are shown in Table 1 below. All CWPTs failed by plastic collapse of the net section area (i.e., in the volume of material ahead of the flaw).

TABLE 1

| Sample | Average Overmatch (%) | Flaw Size | Flaw Area to Gross Section Area Ratio | Flaw Height to Wall Thickness Ratio | Test Temperature (Celsius) | Flaw Location | Global (Remote Pipe Metal) Strain |
|---|---|---|---|---|---|---|---|
| 1-CRA-SMAW-HH | −20.24% | 4 × 50 mm | 4.18% | 31.5% | −2 | Weld | 1.404% |
| 1-CRA-SMAW-HH | −20.24% | 3 × 50 mm | 3.16% | 23.6% | −2 | Weld | 4.821% |
| 1-CRA-SMAW-HH | −20.24% | 3 × 50 mm | 3.22% | 23.6% | −10 | Fusion Line | 3.704% |
| 2-CRA-SMAW-LH | −15.95% | 4 × 50 mm | 4.11% | 31.5% | −10 | Weld | 1.120% |
| 2-CRA-SMAW-LH | −15.95% | 3 × 50 mm | 3.22% | 23.6% | −10 | Weld | 3.113% |
| 2-CRA-SMAW-LH | −15.95% | 3 × 50 mm | 3.22% | 23.6% | −10 | Fusion Line | 6.981% |

Table 2 shows the all-weld metal tensile properties of the CRA welds referred to in Table 1

TABLE 2

| Welds | Average Heat Input (kJ/mm) | All Weld Metal Tensile Yield Strength (ksi) | All Weld Metal Ultimate Tensile Strength (ksi) | All Weld Tensile YS/TS | All Weld Metal Tensile Uniform Elongation |
|---|---|---|---|---|---|
| 1-CRA-SMAW-HH | 2.01 | 63.3 | 96.2 | 0.658 | 24.9% |
| 2-CRA-SMAW-LH | 1.57 | 67.4 | 97.9 | 0.688 | 21.9% |

The strain capacity performance of these CRA welds is far superior to that possible with ferritic materials with similar levels of undermatch. The actual yield strength differences between pipe and weld created about a 16% to about a 20% undermatch. These results were compared with CWPT data generated using conventional carbon steel consumables. For the same pipe grade and specimen geometry, the conventional results show about 0.5% strain capacity for a 4×50 mm flaw and about 2.0% strain capacity for a 3×50 mm flaw using the same specimen geometry and pipe grade.

As indicated by the data above, utilizing CRA weld metals with austenitic and primarily austenitic properties, such as stainless steels and duplex stainless steels, increased global strain (i.e., pipe girth weld strain capacity) as compared to welds with ferritic properties. Thus, by using the present weld techniques, the strain performance of pipeline girth welds is greatly increased. The welds accomplish this improvement by creating a weld metal with enhanced fracture toughness, tearing resistance, and work hardening capacity. Embodiments described herein may accommodate larger weld flaws than ferritic welds and/or larger plastic strains than ferritic welds without failure. Additionally, because of robust mechanical and fracture properties, the use of a CRA, stainless steel or duplex stainless steel welding consumables may result in reduced and/or simplified weld testing and qualification.

In some applications, it may even be possible to relax some weld qualification standards and/or pipeline specifications due to the low YR, high uniform elongation and good toughness and tearing resistance of CRA's. Accordingly, the overall cost may be decreased due to the simplification and reduction of welding parameters and/or testing. The CRA weldments and joints are also beneficial in extreme environments, such as cold environments, where freeze-thaw and soil liquefaction may be experienced, and/or areas where seismic events occur. Other applications using CRA's may include fabrication of pressure vessels and other structures in areas where high axial loading is prevalent or expected.

While the foregoing is directed to embodiments of the present invention, other and further embodiments of the invention may be devised without departing from the basic scope thereof, and the scope thereof is determined by the claims that follow.

The invention claimed is:

1. A method of constructing a pipeline for transporting hydrocarbons, comprising:
   developing a strain-based design for the pipeline based on predicted loads on the pipeline;
   predicting global plastic strains on the pipeline based on the strain-based design;
   selecting a tubing material having primarily ferritic properties and a weld material having primarily austenitic properties to form a weld joint based on the predicted global plastic strains;
   providing two sections of tubing made of the tubing material;
   joining the two sections of tubing with the weld material to form the weld joint; and
   using the weld joint and the two sections of tubing to transport hydrocarbons.

2. The method of claim 1, wherein the weld joint is configured to sustain global plastic strains in excess of 0.5%.

3. The method of claim 1, wherein the weld joint is configured to sustain global plastic strains with weld defects present that have flaw areas in excess of 150 mm$^2$.

4. The method of claim 1, wherein the joining comprises a welding process.

5. The method of claim 4, wherein the welding process is selected from the group consisting of: shielded metal arc welding, gas metal arc welding, gas-tungsten arc welding, flux-cored arc welding, submerged arc welding, double submerged arc welding, pulsed-gas metal arc welding, pulsed-gas tungsten arc welding, laser welding, electron beam welding, and any combinations thereof.

6. The method of claim 1, wherein the weld material comprises a corrosion resistant alloy (CRA).

7. The method of claim 1, wherein the weld material comprises a material created by using a consumable selected from the group consisting of: ENiCrMo-4, ENiCrMo-6, ENiCrMo-14, ENiMo-3, E310, E308, E316, E2209, E2553, and any combinations thereof.

8. The method of claim 1, wherein the tubing material is selected from the group consisting of: API 5L grades X52, X56, X60, X65, X70, X80, X100, X120, and any combinations thereof.

9. The method of claim 1, further comprising preparing at least one end of one of the two sections of tubing prior to joining to enhance weld quality by buttering a layer of CRA weld material on the prepared face of the one of the two sections prior to final joining.

10. The method of claim 1, further comprising pre-joining the two sections of tubing with a material having primarily ferritic properties prior to joining the two sections of tubing with the weld material having primarily austenitic properties.

11. The method of claim 1, wherein the two sections of tubing comprise tubular members formed from a cladded material.

12. The method of claim 1, wherein the two sections of tubing comprise tubular members formed from a single layer of the tubing material.

13. A method of forming a weld joint between tubular sections, comprising:
   developing a strain-based design based on predicted loads on the weld joint;
   selecting a tubing material for the tubular sections having primarily ferritic properties and a weld material having primarily austenitic properties and a yield strength to tensile strength ratio that is less than 0.75 to form the weld joint based on the predicted loads of the strain-based design; and
   joining ends of the tubular sections with a welding process using the primarily austenitic weld material.

14. The method of claim 13, wherein the yield strength of the primarily austenitic weld material is at least 10% less than the yield strength of the tubular sections.

15. The method of claim 13, wherein the primarily austenitic weld material comprises a corrosion resistant alloy.

16. The method of claim 13, wherein the welding process comprises an arc welding process.

17. The method of claim 13, wherein the primarily austenitic weld material comprises a weld material created by using a consumable selected from the group consisting of: ENiCrMo-4, ENiCrMo-6, ENiCrMo-14, ENiMo-3, E310, E308, E316, E2209, E2553, and any combinations thereof.

18. The method of claim 13, wherein the tubular sections comprise tubular sections formed from a cladded material.

19. The method of claim 13, wherein the tubular sections are formed from a single layer of the tubing material.

20. The method of claim 1, wherein the weld joint is configured to sustain global plastic strains in excess of 1%.

21. The method of claim 1, wherein the weld joint is configured to sustain global plastic strains in excess of 1.5%.

22. The method of claim 1, wherein the weld joint is configured to sustain global plastic strains in excess of 2%.

23. The method of claim 6, wherein the joining comprises providing each of a root weld; one or more filler passes; and a cap weld with the weld material.

24. The method of claim 23, wherein the root weld is applied using a gas-tungsten arc welding process and the filler passes and cap weld are applied using a shielded metal arc welding process.

25. The method of claim 13, wherein the yield strength of the primarily austenitic weld material is at least 20% less than the yield strength of the tubular sections.

26. The method of claim 13, wherein the yield strength to tensile strength ratio of the primarily austenitic weld material is less than 0.65.

27. The method of claim 13, wherein the yield strength to tensile strength ratio of the primarily austenitic weld material is less than 0.60.

28. The method of claim 15, wherein the joining comprises providing each of a root weld; one or more filler passes; and a cap weld with the primarily austenitic weld material.

29. The method of claim 28, wherein the root weld is applied using a gas-tungsten arc welding process and the filler passes and cap weld are applied using a shielded metal arc welding process.

30. The method of claim 13, wherein the weld joint is configured to sustain global plastic strains in excess of 1%.

31. The method of claim 13, wherein the weld joint is configured to sustain global plastic strains in excess of 1.5%.

32. The method of claim 13, wherein the weld joint is configured to sustain global plastic strains in excess of 2%.

33. A method for designing a strain-based pipeline for transporting hydrocarbons, comprising:
    developing a strain-based design for the pipeline based on predicted loads on the pipeline;
    predicting global plastic strains on the pipeline based on the strain-based design;
    selecting a tubing material having primarily ferritic properties and a weld material having primarily austenitic properties to form a weld joint based on the predicted global plastic strains; and
    joining two sections of tubing comprising the tubing material with the weld material to form the weld joint and form at least a portion of the strain-based pipeline.

34. The method of claim 33, wherein the weld joint is designed to sustain global plastic strains in excess of 0.5%.

35. The method of claim 33, wherein the weld joint is designed to sustain global plastic strains in excess of 1%.

36. The method of claim 33, wherein the weld joint is designed to sustain global plastic strains in excess of 2%.

37. The method of claim 33, wherein the weld joint is designed to sustain global plastic strains with weld defects present that have flaw areas in excess of 150 $mm^2$.

38. The method of claim 33, wherein the weld material comprises a material created by using a consumable selected from the group consisting of: ENiCrMo-4, ENiCrMo-6, ENiCrMo-14, ENiMo-3, E310, E308, E316, E2209, E2553, or any combinations thereof.

39. The method of claim 33, wherein the tubing material is selected from the group consisting of: API 5L grades X52, X56, X60, X65, X70, X80, X100, X120, and any combinations thereof.

40. The method of claim 33, wherein the weld material comprises a corrosion resistant alloy.

41. The method of claim 33, wherein the yield strength of the weld material is at least 10% less than the yield strength of the tubing.

42. The method of claim 33, wherein the yield strength to tensile strength ratio of the weld material is less than 0.75.

43. The method of claim 33, wherein the yield strength to tensile strength ratio of the weld material is less than 0.60.

* * * * *